United States Patent [19]

Arruda et al.

[11] 3,962,169

[45] June 8, 1976

[54] FLUOROELASTOMER LATEX CONTAINING LITHIUM ION AND A CREAMING AGENT AND PROCESS FOR PREPARATION THEREOF

[75] Inventors: Paul Jeffrey Arruda, Wilmington, Del.; Charles Launcelot Barber, Jr., Chester, Va.

[73] Assignee: E. I. Du Pont de Nemours and Company, Wilmington, Del.

[22] Filed: May 27, 1975

[21] Appl. No.: 581,150

Related U.S. Application Data

[63] Continuation-in-part of Ser. No. 488,528, July 15, 1974, abandoned.

[52] U.S. Cl............... 260/29.6 F; 260/17.4 R; 260/29.6 MP; 526/173; 526/193; 526/255; 528/492

[51] Int. Cl.$^2$............................................. C08L 27/16

[58] Field of Search....... 260/29.6 F, 80.77, 87.5 A, 260/45.7 R, 87.7, 17.4 R, 29.6 MP

[56] References Cited
UNITED STATES PATENTS

| | | | |
|---|---|---|---|
| 2,955,099 | 10/1960 | Mallouk et al.............. | 260/45.7 R |
| 3,038,870 | 6/1962 | Schott........................ | 260/29.6 F |
| 3,190,864 | 6/1965 | Shipp et al.................. | 260/45.7 R |
| 3,438,934 | 4/1969 | Rheinhardt.................. | 260/29.6 F |
| 3,554,955 | 1/1971 | Hartwimmer et al......... | 260/29.6 F |
| 3,694,392 | 9/1972 | Werner, Jr................... | 260/29.6 F |
| 3,700,627 | 10/1972 | Miller......................... | 260/29.6 F |
| 3,830,770 | 8/1974 | Ribbans III.................. | 260/29.6 F |

FOREIGN PATENTS OR APPLICATIONS

| | | | |
|---|---|---|---|
| 1,941,499 | 2/1970 | Germany..................... | 260/29.6 F |

*Primary Examiner*—Eugene C. Rzucidlo

[57] ABSTRACT

A fluoroelastomer latex which remains useful after being stored for a long period of time and which can be produced by a process employing a relatively brief residence time in the reactor can be prepared by (A) forming an aqueous emulsion of monomers capable of being copolymerized into a fluoroelastomer, said emulsion comprising (1) vinylidene fluoride plus at least one other fluorine-containing monomer, (2) a specified amount of lithium ion, and (3) an inorganic free-radical initiator; (B) subjecting said emulsion to copolymerization to form a fluoroelastomer latex; and (C) adding a creaming agent to the latex; and optionally carrying out creaming of the latex to form a layer of creamed (high solids) latex, followed by isolating the creamed latex.

20 Claims, No Drawings

FLUOROELASTOMER LATEX CONTAINING LITHIUM ION AND A CREAMING AGENT AND PROCESS FOR PREPARATION THEREOF

CROSS-REFERENCE TO RELATED APPLICATION

This is a continuation-in-part of patent application Ser. No. 488,528, filed on July 15, 1974, now abandoned.

BACKGROUND OF THE INVENTION

This invention relates to a fluoroelastomer latex and a process for preparing such a latex.

The industries which manufacture and use fluoroelastomer latex compositions are in need of a fluoroelastomer latex which is capable of remaining useful after being stored for a long period of time, and capable of being formed during a relatively brief residence time (e.g., about 5–15 minutes), in an emulsion polymerization reactor. What is especially desired in certain applications is a fluoroelastomer latex which is still useful after at least 12 months (preferably at least 18 months) of storage at about room temperature.

SUMMARY OF THE INVENTION

The present invention provides a process for preparing a fluoroelastomer latex which comprises
  A. forming an aqueous emulsion of monomers capable of being copolymerized into a fluoroelastomer, said emulsion comprising
    1. vinylidene fluoride plus at least one other fluorine-containing monomer in an amount such that the total monomer content of the emulsion is about 10–35% by weight,
    2. about 30 to 100 parts by weight of lithium ion per million parts of the emulsion, and
    3. an inorganic free-radical initiator in an amount which permits the free-radical emulsion copolymerization of the monomers,
  B. subjecting said emulsion to free-radical emulsion copolymerization in a reaction zone at a temperature of about 50°–135°C. and a pressure of about 7–140 kg./cm.$^2$ to form a fluoroelastomer latex, and
  C. adding a creaming agent to the resulting fluoroelastomer latex in an amount equal to about 0.07–3.0 grams of creaming agent per 100 grams of fluoroelastomer present.

The process optionally includes the steps of creaming (causing a layer of creamed or high-solids latex to form), and isolating the creamed latex.

This invention also provides a novel fluoroelastomer latex which is an aqueous dispersion of an elastomeric copolymer of vinylidene fluoride and at least one other fluorine-containing monomer, said dispersion having
  a. a content of said copolymer of about 10–75% by weight;
  b. a lithium ion content of about 30–400 parts per million,
  c. a pH of about 3–7, and
  d. a creaming agent content of about 0.07–3.0 grams per 100 grams of fluoroelastomer present.

DESCRIPTION OF PREFERRED EMBODIMENTS

The fluoroelastomer component of the present latex is an elastomeric copolymer of vinylidene fluoride and at least one other fluorine-containing monomer. The fluoroelastomer preferably has a vinylidene fluoride content of about 25–70% by weight. The "other fluorine-containing monomer" is usually an ethylenically unsaturated monomer containing at least one fluorine atom substituent on each double-bonded carbon atom. The copolymer is preferably composed of at least one of the following: copolymers of vinylidene fluoride and hexafluoropropylene or pentafluoropropylene; copolymers of vinylidene fluoride, tetrafluoroethylene and hexafluoropropylene or pentafluoropropylene; and copolymers of vinylidene fluoride, a perfluoroalkyl perfluorovinyl ether and tetrafluoroethylene. Especially preferred is a copolymer which contains, as interpolymerized units, about 25–70% by weight of vinylidene fluoride, 19–60% by weight of hexafluoropropylene and 3–35% by weight of tetrafluoroethylene. Also very useful is a copolymer which contains, as interpolymerized units, about 30–70% by weight of vinylidene fluoride and about 70–30% by weight of hexafluoropropylene.

Copolymers of vinylidene fluoride and hexafluoropropylene are described in U.S. Pat. No. 3,051,677 issued to Rexford. Copolymers of vinylidene fluoride, tetrafluoroethylene and hexafluoropropylene are described in U.S. Pat. No. 2,968,649 issued to Pailthorp and Schroeder. Copolymers of vinylidene fluoride and pentafluoropropylene are described in U.S. Pat. No. 3,331,823 issued to Sianesi et al.; and copolymers of these two components with tetrafluoroethylene are described in U.S. Pat. No. 3,335,106 issued to Sianesi et al. Copolymers of vinylidene fluoride, a perfluoroalkyl perfluorovinyl ether (having 1–5 carbon atoms in the alkyl group) and tetrafluoroethylene are described in U.S. Pat. No. 3,235,537 issued to Albin and Gallagher.

The novel latex has a copolymer (fluoroelastomer) content based on the weight of the latex, of about 10–75%. A copolymer content of about 10–35% is preferred in some applications; and a copolymer content of about 40–75% is preferred in other applications.

The latex has a pH of about 3–7, preferably about 4.5–6.5. Also, the latex has a lithium ion content of about 30 to 400 parts by weight (preferably about 40 to 225 parts) per million parts by weight of the latex. In a typical composition, one will find that less of the lithium ion is needed in order to get good results when the fluoroelastomer has a relatively high molecular weight than when the fluoroelastomer has a somewhat lower molecular weight.

The lithium ions are present in the latex as the result of adding lithium hydroxide or another suitable lithium compound during the preparation of the latex as described below.

The latex also has a creaming agent content of about 0.07–3 grams per 100 grams of fluoroelastomer present. The creaming agent is discussed below.

The latex can also contain one or more additives known to be useful in fluoroelastomer latex compositions, for example, fillers, coloring agents, surfactants and curing agents. When the latex is to be used for the manufacture of crack-free fluoroelastomer films, it preferably contains a suitable anionic surfactant such as a mixture of mono and di esters of phosphoric acid with nonylphenoxypolyethyleneoxyglycol having an average molecular weight of about 4,000– 6,000. The weight ratio of the mono ester to di ester components of such a mixture is usually about 40:60 to 60:40. A small amount of a nonionic surfactant (e.g., said oxyglycol) can also be used along with said anionic surfactant; for example, one can add about 0.1–5% of non-ionic surfactant based on the weight of the anionic surfactant. The surfactant can be added at any convenient time during the preparation of the latex by the process described herein, for example, during or after any step of the process, preferably after step (B). A useful anionic surfactant content is illustrated by about 3–10 parts by weight for each 100 parts by weight of fluoroelastomer present in the latex. However, in many applications, the latex is very useful even when no surfactant at all is added; this is shown below in Example 1.

In carrying out the process of this invention, one first prepares an aqueous emulsion of monomers capable of being copolymerized to form a fluoroelastomer. This is step (A) of the process as described above. This emulsion contains the required fluorine-containing monomers in an amount such that the total monomer content of the emulsion is about 10–35% by weight. The emulsion also contains an inorganic free-radical initiator in an amount which permits the free-radical emulsion copolymerization of the monomers. In some applications, the initiator is used in combination with a reducing agent. One skilled in the art will have no difficulty in selecting a suitable type and amount of initiator to fit the needs of a particular application in view of the teaching in such prior art as the U.S. patents mentioned above in reference to the known vinylidene fluoride copolymers which are useful as fluoroelastomers; also in view of the teaching of U.S. Pat. No. 3,839,305 issued to A. L. Moore on Oct. 1, 1974. If desired, the initiator can be used in combination with a reducing agent and/or a chain transfer agent as taught in said prior art including said Moore patent.

The emulsion of step (A) also has a lithium ion content of about 30 to 100 parts by weight (preferably about 30 to 60 parts) per million parts by weight of the emulsion. A preferred way to provide the lithium ions is to mix enough lithium hydroxide with the emulsion so that the emulsion has a pH of about 2–7, preferably about 3–5. However, the required lithium ion content can also be provided by adding any other suitable known lithium compound, preferably a water-soluble lithium salt; such a salt can be formed insitu. Useful lithium compounds other than lithium hydroxide include lithium acetate, lithium chloride, lithium bromide, lithium formate, lithium fluoride, lithium fluorosulfonate, lithium citrate, lithium sulfate and the like. Sodium hydroxide or other suitable alkaline compounds known to be useful for adjusting emulsion pH can be used in combination with the lithium compound to provide an emulsion pH within the range mentioned earlier in this paragraph.

In step (B), the emulsion is subjected to free-radical emulsion copolymerization in a reaction zone by maintaining the emulsion at a temperature of about 50°–135°C. and under a pressure of about 7–140 kg./cm.$^2$ to form a fluoroelastomer latex. It is not necessary to carry out the step (B) reaction in the presence of an inert gas.

One will often prefer to carry out the process so that the emulsion components of step (A) are continuously fed to the reaction zone, and the step (B) copolymerization is carried out as a continuous process wherein the emulsion has an average residence time in the reaction zone of about 5–30 minutes, preferably about 8–13 minutes. The average residence time can be calculated by dividing the reactor volume by the volume of water fed to the reactor per hour.

After step (B), the pH of the latex is preferably adjusted to about 4.5–7. This is preferably done by mixing lithium hydroxide with the latex. Another method is to add sodium hydroxide or other suitable alkaline compound in combination with lithium chloride or another lithium compound as indicated above in the discussion of the step (A) emulsion. In the embodiments wherein an anionic surfactant is added as described above, the surfactant is preferably added prior to such pH adjustment.

In step (C), a creaming agent is added to the latex in an amount equal to about 0.07–3 grams (preferably about 0.1–0.6 gram) of creaming agent per 100 grams of fluoroelastomer present. This is preferably done after the pH adjustment described in the previous paragraph. A preferred creaming agent is ammonium alginate; however, one can also use sodium alginate or other known creaming agents.

The latex resulting from step (C) has a relatively low fluoroelastomer content (e.g., about 10–35% by weight), and it is useful for forming applications without further modification.

When a latex product of the present invention is desired which has a relatively high fluoroelastomer content (e.g., about 40–75%, preferably about 55–70%, by weight), one can prepare such a latex by carrying out the additional steps of creaming the fluoroelastomer latex resulting from step (C) to form a creamed latex having a fluoroelastomer content of about 40–75% by weight, and isolating the creamed latex. The creaming procedure described by Buffington in U.S. Pat. No. 2,878,196 illustrates a useful known way to cream a latex. After one has added a suitable amount of creaming agent, the mixture is allowed to stand until the desired degree of creaming has taken place. At the end of the creaming step, the lower liquid phase is a concentrated dispersion of polymer (creamed latex), and the upper liquid phase is a serum containing water and various contaminants.

In step (E) one separates or isolates the creamed latex formed in step (D). This can be done by methods known to be useful for separating one liquid phase from another, for example, by decantation. The resulting high-solids latex is more useful than a low-solids latex in applications where one wishes to form relatively thick cast films, or where it is desired to minimize the cost of transporting the latex.

Fluoroelastomer latex compositions having excellent shelf life and a fluoroelastomer solids content within a broad range (from very high to very low solids content) can be prepared in accordance with the present invention which have beneficial utility in the manufacture of fluoroelastomer films, coating and composite sheet materials containing fibers and a fluoroelastomer binder. The latex is very useful as a binder for heat-resistant fibers (e.g., asbestos, glass or polyimide fibers) in the production of resilient, heat-resistant gaskets and insulation products. The process of this invention, because of the use of the lithium ion content as specified in combination with the other ingredients enables one to prepare such fluoroelastomer latex compositions by using a relatively brief residence time in the polymerization reactor employed to form the copolymer; this results in an important economic advantage. Moreover, the process enables one to prepare such latex compositions, even when no surfactant is added, which are capable of remaining useful after being stored for long periods of time. A typical latex of this invention can be stored for twelve months or even eighteen months or more at about room temperature and still be useful for the applications mentioned above. This advantage is important to those who make, ship, buy or use fluoroelastomer latex compositions; and it is surprising advantage. It will be apparent that one can experience a serious financial loss if a sizable quantity of fluoroelastomer latex becomes useless during storage before one is able or ready to use it for the intended purpose.

EXAMPLE 1

This example, and those that follow, illustrate the invention; all amounts are by weight unless otherwise indicated.

A fluoroelastomer latex having a relatively high fluoroelastomer content (69.1%) is prepared by a process composed of the following operations:

1. Continuously feeding the monomers described below to a 1-liter stainless-steel pressure vessel reactor (polymerization reaction zone), while operating the stirrer of the reactor at 900 rpm for thorough mixing of the reactor contents, and while the contents of the reactor are heated at 128°C. under a pressure of 63 kg./cm.$^2$ so that the reaction mixtured form in operation (2) below will undergo an emulsion polymerization reaction as it passes through the reactor, the reactor residence time being about 9 minutes based on the ratio of the 1-liter reactor to the emulsion output rate (or water input rate) of about 7 liters per hour, the monomers and the feed rate for each being 844 grams per hour of vinylidene fluoride, 617 grams per hour of hexafluoropropylene and 390 grams per hour of tetrafluoroethylene;

2. During operation (1), constantly feeding to the reactor through a first metering pump during each hour a solution composed of 3.92 grams of ammonium persulfate dissolved in 3409 ml. of water (distilled), and simultaneously feeding to the reactor through a second metering pump during each hour a solution composed of 7.64 grams of lithium hydroxide and 4.65 grams of sodium sulfite dissolved in 3670 ml. of water, the reaction mixture being at a pH of 3.3; the reaction mixture (emulsion) being formed in the reactor has a lithium ion content of about 43 parts per million parts of the emulsion;

3. Continuously removing from the reactor the resulting copolymer latex which is continuously formed during operations (1) and (2), the latex being passed first through a back-pressure regulating valve set to maintain the desired reactor pressure of 63 kg./cm.$^2$;

4. After discarding the latex obtained during the first 5 residence times, collecting the desired quantity of latex and mixing it for uniformity, the latex having a pH of about 3.3, a lithium ion content of about 43 parts per million, and a copolymer solids content of 20.45%;

5. Pouring the latex through a 50-micron filter bag;

6. Gradually adding to the resulting latex enough of a 10% aqueous lithium hydroxide solution to raise the latex pH to 6.0;

7. Mixing with the resulting latex 10 liters of a 1% aqueous solution of ammonium alginate (creaming agent) for each 100 liters of the latex;

8. Allowing the mixture to stand for 16 hours at 22°C.; and

9. Separating the creamed latex by decanting off the upper serum layer, and pouring the creamed latex through a cheesecloth filter after adjusting the latex pH with 10% lithium hydroxide solution to about 6.4.

The latex product obtained in step (9) has a fluoroelastomer content of 69.1%, a lithium ion content of about 55 parts per million parts of latex, and a Brookfield viscosity of 133 cps. (No. 2 spindle at 30 rpm). The fluoroelastomer is a copolymer whose interpolymerized units are 45% vinylidene fluoride, 30% hexafluoropropylene and 25% tetrafluoroethylene.

All or part of the ammonium alginate used in step (7) can be replaced with sodium alginate in applications where it is not objectionable to obtain a somewhat darker-appearing product.

For some applications, it will be desirable to add to the latex one or more curing agents, fillers and/or coloring agents known to be useful in fluoroelastomer latex compositions.

The Example 1 latex can be used in the manufacture of high quality fluoroelastomer reinforced asbestos sheet material having good strength, elongation and fluid resistance properties by forming a 4% aqueous slurry of asbestos fibers containing a small amount of a suitable surfactant, mixing the latex (with or without dilution) with the asbestos slurry, reducing the pH of the mixture to 4.5 with aqueous alum solution, forming the mixture into sheets in a manner known to be useful for preparing asbestos sheets, and drying the resulting sheets in a drum-dryer and pressing them to the desired thickness. In a typical application, enough of the latex is used so that the product contains 20 parts of the fluoroelastomer for each 100 parts of asbestos.

The Example 1 latex has the utility described in the paragraph preceding Example 1. Quite unexpectedly, the utility of the latex after it has been stored for twenty-one months at 22°C. is found to be about the same as that of the freshly-prepared latex. Any of the fluoroelastomer component which has settled out is easily and satisfactorily redispersed by briefly stirring the latex. It is surprising that the fluoroelastomer is easily redispersed after such a long storage period.

When Example 1 is repeated except in that the lithium hydroxide is replaced with enough sodium hydroxide in steps (2), (6) and (8) to provide the specified pH, and the resulting latex is examined after being stored for nine months at 22°C., it is found that the latex is no longer useful because the fluoroelastomer at the bottom of the container cannot be redispersed with stirring to provide a useful latex.

EXAMPLE 2

A fluoroelastomer latex having considerably lower fluoroelastomer content than the product of Example 1 (about 18%) is prepared by repeating Example 1 except that steps (8) and (9) are omitted; and there is an additional step, (5a), immediately after step (5). Step (5a) consists of adding an anionic surfactant in an amount equal to four parts of the surfactant for each 100 parts of fluoroelastomer present; said surfactant is a mixture of mono and di esters of phosphoric acid with nonylphenoxypolyethyleneoxyglycol, the weight ratio of mono ester to di ester in said mixture being about 50:50 and said mixture having an average molecular weight of about 5000.

The resulting fluoroelastomer latex is useful for the manufacture of crack-free fluoroelastomer films and coatings; and it can be used for the manufacture of fluoroelastomer-reinforced asbestos sheet material in about the same manner as described in Example 1.

EXAMPLE 3

A fluoroelastomer latex having a relatively high fluoroelastomer content (about 67%) and having utility as described in Example 2 is prepared by repeating Example 1 except that there is an additional step (5a) as described in Example 2 immediately after step (5) wherein an anionic surfactant is added to the latex. When a 1.2 mm. thick fluoroelastomer film is made by casting a layer of the Example 3 latex and drying it, the film is free of cracks.

It will be apparent that the process for preparing the latex materials of Examples 2 and 3 has beneficial utility when compared with another process which can be used for the manufacture of a fluoroelastomer latex for making crack-free films wherein one must first prepare an organic solvent solution of the fluoroelastomer followed by forming an aqueous fluoroelastomer dispersion and removing the organic solvent before creaming the latex.

We claim:

1. A process for preparing a fluoroelastomer latex which comprises
   A. forming an aqueous emulsion of monomers capable of being copolymerized into a fluoroelastomer, said emulsion comprising
      1. vinylidene fluoride plus at least one other fluorine-containing monomer in an amount such that the total monomer content of the emulsion is about 10–35% by weight,
      2. about 30 to 100 parts by weight of lithium ion per million parts of the emulsion, and
      3. an inorganic free-radical initiator in an amount which permits the free-radical emulsion copolymerization of the monomers,
   B. subjecting said emulsion to free-radical emulsion copolymerization in a reaction zone at a temperature of about 50°–135°C. and a pressure of about 7–140 kg./cm.$^2$ to form a fluoroelastomer latex, and
   C. adding a creaming agent to the resulting fluoroelastomer latex in an amount equal to about 0.07–3.0 grams of creaming agent per 100 grams of fluoroelastomer present.

2. A process according to claim 1 which also comprises
   D. creaming the fluoroelastomer latex resulting from step (C) to form a creamed latex having a fluoroelastomer content of about 40–75% by weight, and
   E. isolating the creamed latex.

3. A process according to claim 2 wherein the step (A) emulsion has a pH of about 2–7.

4. A process according to claim 3 wherein the emulsion components of step (A) are continuously fed to the reaction zone, and the step (B) copolymerization is carried out as a continuous process wherein the emulsion has an average residence time in the reaction zone of about 5–30 minutes.

5. A process according to claim 4 wherein the step (A) emulsion has a pH of about 3–5.

6. A process according to claim 4 wherein said average residence time is about 8–13 minutes.

7. A process according to claim 5 wherein the pH of the latex is adjusted to about 4.5–7 after step (B).

8. A process according to claim 7 wherein the pH is adjusted by adding lithium hydroxide to the latex.

9. A process according to claim 8 wherein said creaming agent is ammonium alginate.

10. A process according to claim 9 wherein the amount of creaming agent added is about 0.1–0.6 gram per 100 grams of fluoroelastomer present.

11. A process according to claim 9 wherein the creaming agent is added after the pH is adjusted with lithium hydroxide.

12. A process according to claim 11 wherein about 3–10 grams of an anionic surfactant per 100 grams of fluoroelastomer present are added to the latex before the pH is adjusted with lithium hydroxide.

13. A process according to claim 12 wherein said surfactant is a mixture of mono and di esters of phosphoric acid with nonylphenoxypolyethyleneoxyglycol.

14. As a novel fluoroelastomer latex, an aqueous dispersion of an elastomeric copolymer of vinylidene fluoride and at least one other fluorine-containing monomer, said dispersion having
   a. a content of said copolymer of about 10–75% by weight,
   b. a lithium ion content of about 30–400 parts per million,
   c. a pH of about 3–7, and
   d. a creaming agent content of about 0.07–3.0 grams per 100 grams of fluoroelastomer present.

15. A latex according to claim 14 wherein said copolymer contains, as interpolymerized units, about 25–70% by weight of vinylidene fluoride, 19–60% by weight of hexafluoropropylene and 3–35% by weight of tetrafluoroethylene.

16. A latex according to claim 14 wherein said copolymer contains, as interpolymerized units, about 30–70% by weight of vinylidene fluoride and about 70–30% by weight of hexafluoropropylene.

17. A latex according to claim 15 wherein the lithium ion content is about 40 to 225 parts per million, and the pH is about 4.5–6.5.

18. A latex according to claim 17 wherein said copolymer content is about 10–35% by weight.

19. A latex according to claim 17 wherein said copolymer content is about 40–75% by weight.

20. A latex according to claim 17 which contains about 3–10 grams of an anionic surfactant per 100 grams of fluoroelastomer present.

* * * * *